United States Patent [19]

Yip et al.

[11] Patent Number: 4,620,416
[45] Date of Patent: Nov. 4, 1986

[54] LOAD SENSING SYSTEM

[75] Inventors: James K. Yip, Richfield; William J. Novacek, Bloomington, both of Minn.

[73] Assignee: Eaton Corporation, Cleveland, Ohio

[21] Appl. No.: 388,378

[22] Filed: Jun. 14, 1982

[51] Int. Cl.$^4$ .............................................. B62D 5/08
[52] U.S. Cl. ....................................... 60/384; 60/385; 137/596.13
[58] Field of Search ................. 60/384, 385; 418/61 B; 137/596.13

[56] References Cited

U.S. PATENT DOCUMENTS

| | | | |
|---|---|---|---|
| 3,455,210 | 7/1969 | Allen | 91/446 |
| 3,971,216 | 7/1976 | Miller | 60/445 |
| 4,043,419 | 8/1977 | Larson et al. | 60/384 |
| 4,065,921 | 1/1978 | Baatrup et al. | 60/385 |
| 4,096,883 | 6/1978 | Yip | 137/596.13 |

Primary Examiner—Robert E. Garrett
Assistant Examiner—John M. Husar
Attorney, Agent, or Firm—C. H. Grace; L. J. Kasper

[57] ABSTRACT

An improved fluid controller (17) is disclosed of the type for use in a load sensing hydrostatic steering system. The system includes a load sensing priority flow control valve (15) of the type which operates on a dynamic load signal. The controller includes a spool valve (95) and a sleeve valve (97) which cooperate to define a plurality of orifices including a main variable flow control orifice (71) and a variable orifice (75) through which fluid flows from the return side of a steering cylinder (19) to the return port (25) of the controller. A variable drain orifice (76) communicates between the main flow path, downstream of the main orifice (71) and the return port (25). As the controller valving moves from its neutral position toward an operating position, the orifice (75) begins to open at least as soon as the main orifice (71) and reaches a predetermined flow area before the main orifice (71) reaches that predetermined flow area. In addition, the drain orifice (76) remains open at least until the variable orifice (75) begins to open to reduce undesirable high transition pressures in the controller.

10 Claims, 7 Drawing Figures

LOAD SENSING SYSTEM

BACKGROUND OF THE DISCLOSURE

The present invention relates to fluid controllers, and more particularly, to such controllers which are used in load sensing hydraulic systems.

It will become apparent to those skilled in the art that the present invention may be used advantageously with any type of fluid controller which is operable to control the flow of fluid from a source of pressurized fluid to a fluid operated device, wherein the source of fluid includes pressure responsive means for varying the delivery of fluid to the controller. The present invention is especially useful when applied to controllers such as the steering control unit of a full fluid-linked vehicle steering system, and the invention will be described in connection therewith.

The use of load sensing controllers has become increasingly popular, partly because such controllers result in a constant fluid flow for a given rate of steering wheel rotation, regardless of steering load, and partly because such controllers save a substantial amount of energy, when compared to conventional open center and closed center controllers.

Load sensing controllers are normally used in a system of the type shown in U.S. Pat. No. 3,455,210, assigned to the assignee of the present invention. Such systems include a load sensing priority flow control valve which directs pump output flow to either the load sensing controller, which is the priority device, or an auxiliary load circuit, in response to variations in the steering load signal. Initially, the load signal used in such systems was a "static" load signal, i.e., there was no flow in the load signal circuit in the steady-state condition. Also, the load sensing systems initially commercialized used fixed displacement pumps, and because of the constant flow available from the fixed pump, the response time by the system to changes in the static load signal was generally satisfactory.

More recently, load sensing controllers are being used commercially in systems including load sensing pumps, i.e., the load signal from the controller is transmitted both to the load sensing priority flow control valve and to the load sensing pump. Because the load sensing pump delivers fluid only in response to a demand for fluid, and must increase pump stroke in order to do so, it has been found that system response time is not always satisfactory when using a static load signal, which is typically bled to the system reservoir when the controller is in neutral.

Partly to improve system response time, much work has been done by those skilled in the art with regard to the use of "dynamic" load signals, i.e., load signals wherein a small amount of fluid is pumped from the priority outlet port of the priority flow control valve, through the load signal circuit, and into the fluid controller where it recombines with the main flow path, downstream of the main variable flow control orifice. The use of a dynamic load signal has other advantages besides response time. For example, the dynamic signal, flowing toward the controller, permits the use of a check valve in the load signal line which prevents "wheel kick" by preventing the escape of fluid from the controller when steering against a volume of fluid which is trapped in the steering cylinder.

In the initial work with dynamic load signal systems, the controllers were the same as those which had been used with static load signals. One problem which resulted was the occurrence of "high transition pressures", i.e., when the controller valving was in transition between the neutral position and the fully actuated position, a substantial buildup of pressure would occur between the pump and the priority flow control valve. This pressure buildup would create an excessive load on both the pump and the vehicle engine, and the throttling of the high pressure fluid would create heat, wasting engine horsepower.

SUMMARY OF THE INVENTION

Accordingly, it is an object of the present invention to provide a load sensing fluid controller for use in a system utilizing a dynamic load signal which is able to substantially eliminate the high transition pressure condition described above.

The above and other objects of the present invention are accomplished by the provision of an improved controller for use in the type of system described previously. The controller is of the type including housing means including an inlet port for connection to the source of fluid, a return port for connection to a reservoir, first and second control fluid ports for connection to the steering cylinder, and a load signal port for connection to the priority flow control valve. Valve means is disposed in the controller housing and defines a neutral position and at least one operating position. The controller includes means for imparting follow-up movement to return the valve means to the neutral position in response to the flow of fluid to or from the steering cylinder. The valve means defines a load signal circuit operable to communicate to the load signal port a fluid pressure representative of the steering load. The valve means cooperates with the housing means to define a first flow path communicating between the inlet port and the follow-up means, a second flow path communicating between the follow-up means and one of the control ports, and a third flow path communicating between the other control port and the return port. The first, second, and third flow paths include first, second, and third variable orifices, respectively. At least the first and third variable orifices have a zero flow area when the valve means is in neutral, and a gradually increasing flow area as the valve means is moved toward the operating position. The valve means and the housing means define a drain flow path communicating between the load signal circuit and the return port and including a variable drain orifice having a maximum flow area when the valve means is in neutral, and progressively decreasing to a zero flow area as the valve means moves toward the operating position. The source of pressurized fluid includes means operable to communicate a dynamic load signal into the load signal circuit.

The improved controller is characterized by the third variable orifice beginning to open before the first variable orifice begins to open as the valve means moves from the neutral position to the operating position. In addition, the variable drain orifice remains open at least until the third variable orifice begins to open, thereby substantially reducing pressure spikes in the flow paths as the valve means moves from neutral to the operating position.

DESCRIPTION OF THE PREFERRED EMBODIMENT

Figure 1:
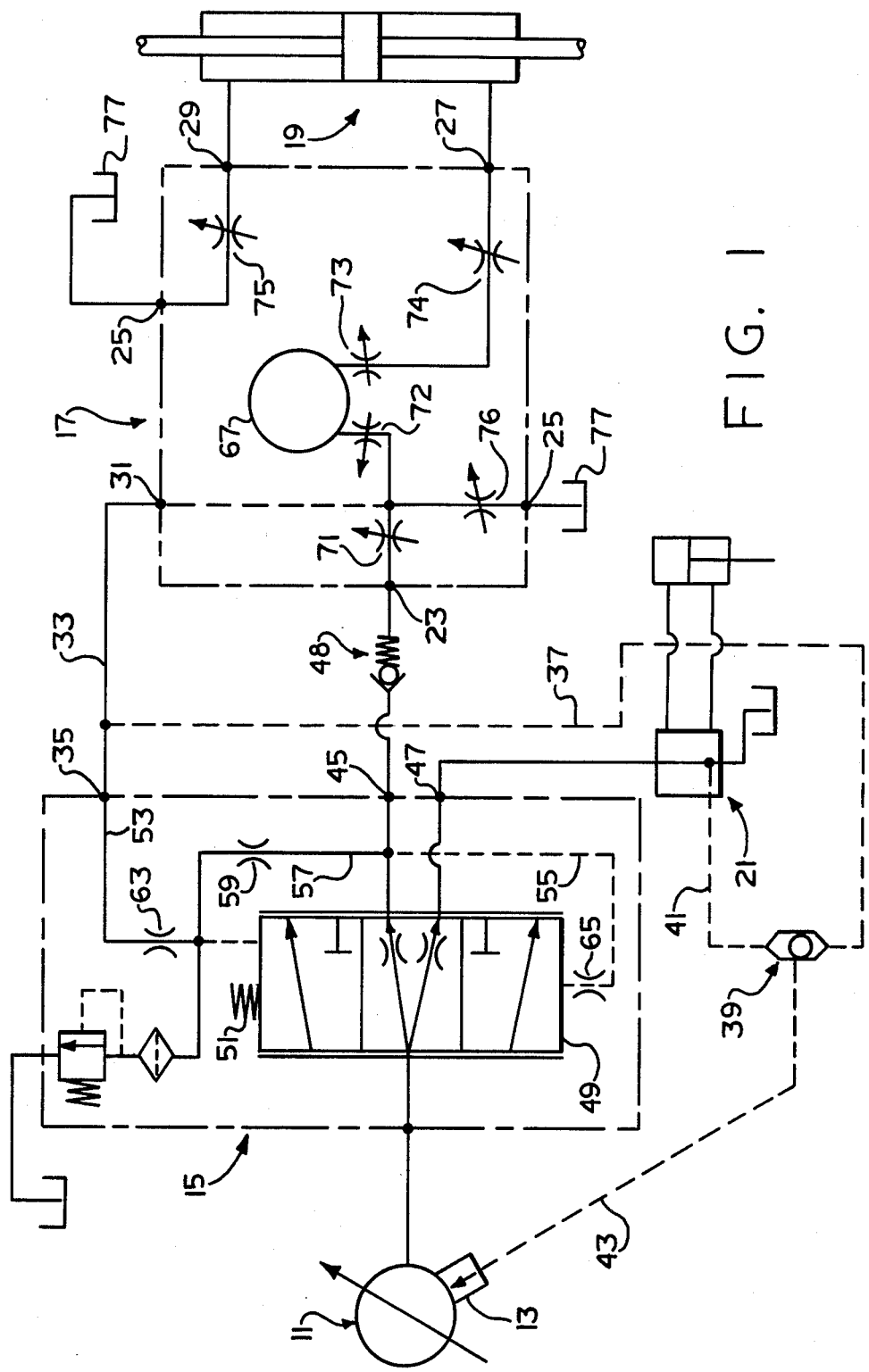
FIG. 1 is a hydraulic schematic of a load sensing, hydrostatic power steering system of the type with which the present invention may be utilized.

Referring now to the drawings, which are not intended to limit the invention, FIG. 1 is a schematic of a vehicle hydrostatic steering system including a fluid controller made in accordance with the teachings of the present invention. The system includes a fluid pump 11, shown herein as including a load sensing displacement control mechanism 13. The system also includes a pilot operated, load sensing priority flow control valve generally designated 15. The control valve 15 apportions the flow of fluid from the pump 11 between (1) a primary circuit including a fluid controller, generally designated 17, and a fluid operated steering cylinder 19 and (2) a load sensing auxiliary circuit, generally designated 21.

Referring still to FIG. 1, the fluid controller 17 includes an inlet port 23, a return port 25, and a pair of control (cylinder) ports 27 and 29 which are connected to the opposite ends of the fluid motor 19. The controller 17 further includes a load signal port 31, which is connected to a load signal line 33, the line 33 also being connected to a signal port 35 of the priority valve 15. A signal line 37 has one end connected to the signal line 33, and its other end connected to one inlet of a shuttle valve 39. The other inlet of the shuttle valve 39 is connected to a load signal line 41 of the auxiliary load circuit 21. The outlet of the shuttle valve 39 is connected by a signal line 43 to the displacement control mechanism 13 of the pump 11, such that the mechanism 13 is always responsive to the higher of the two load pressure signals present in the signal lines 37 and 41.

The priority flow control valve 15 may be of the type illustrated in U.S. Pat. No. 3,455,210, assigned to the assignee of the present invention, and incorporated herein by reference. The priority control valve 15 includes a priority outlet port 45 which is connected to the inlet port 23 of the controller 17, and an excess flow outlet port 47 which is connected to the auxiliary circuit 21. Disposed in series flow relationship between the priority outlet port 45 and the inlet port 23 is a check valve 48 which is preferably a combination check valve and "pressure drop" valve of the type shown and claimed in U.S. Pat. No. 4,011,721, assigned to the assignee of the present invention and incorporated herein by reference. The check valve 48 is operable to maintain a nearly constant pressure drop, across the valve 48, regardless of the flow rate therethrough.

The priority control valve 15 includes a valve spool 49 which is biased by a compression spring 51 toward a position permitting substantially all inlet fluid to flow to the priority outlet port 45. The spring 51 is aided by the pressure in a signal line 53, communicating between the port 35 and the upper end (in FIG. 1) of the spool 49. In opposition to these biasing forces is the pressure exerted by a pilot signal 55, communicated from the priority outlet port 45 to the lower end (in FIG. 1) of the spool 49. The general structure and operation of the priority control valve 15 are well known in the art, and because they form no part of the present invention, will not be described further herein.

In the subject embodiment of the present invention, the priority control valve 15 is of the type which provides a "dynamic" load signal, i.e., one in which there is actual flow through the load signal lines, rather than providing merely a "static" load signal, i.e., one in which there is no flow through the signal lines except during transient conditions. In order to accomplish the provision of the dynamic load signal, there is a flow path 57 interconnecting the priority outlet port 45 and the signal line 53, permitting a flow into the signal line 53. The dynamic signal flow is limited by a fixed orifice 59 in the flow path 57. In addition, the signal lines 53 and 55 include damping orifices 63 and 65, respectively, to dampen the variations in the opposing pressure signals acting on the spool 49.

Figure 2:
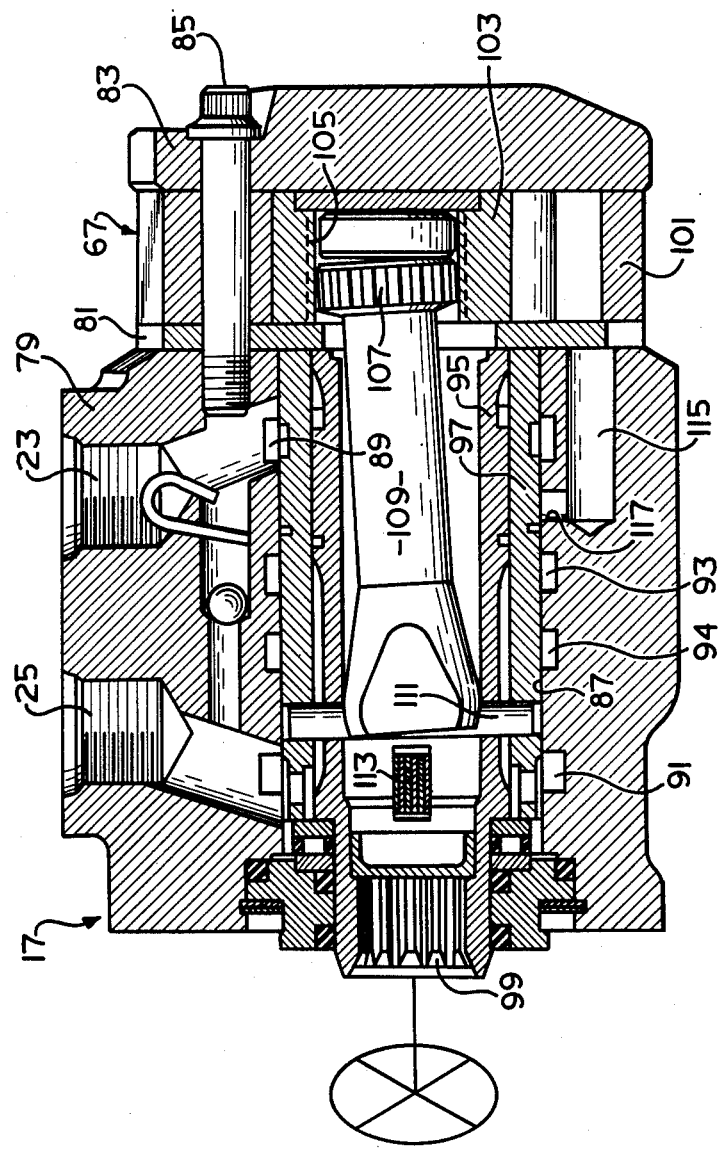
FIG. 2 is an axial cross section of a fluid controller of the type to which the present invention relates.
Figure 3:
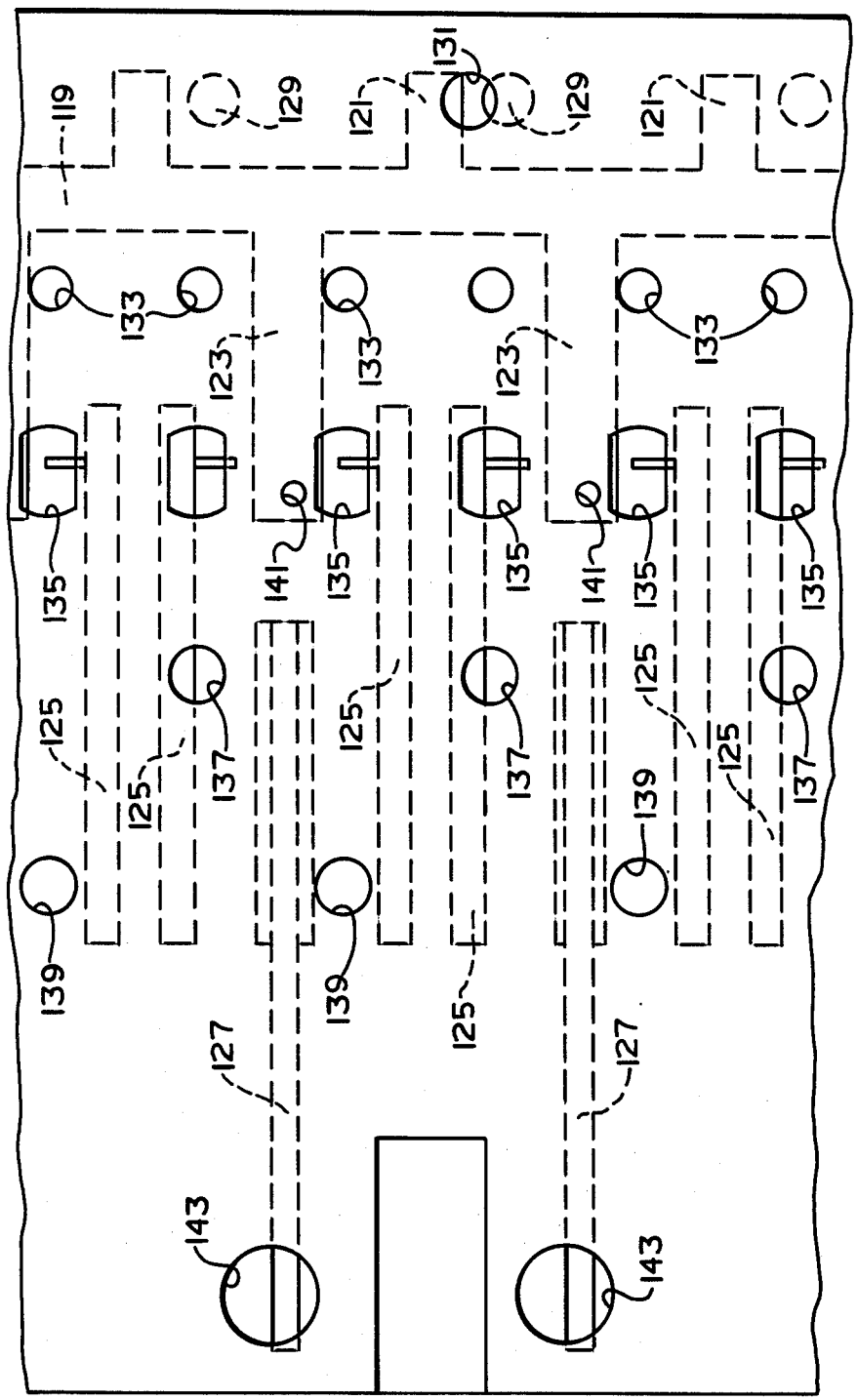
FIG. 3 is a fragmentary, overlay view of the valving used in the fluid controller of FIG. 2, but on a larger scale than FIG. 2.

The fluid controller 17, which is shown in greater detail in FIGS. 2 and 3, may be of the type illustrated and described in U.S. Pat. No. Re. 25,126, assigned to the assignee of the present invention, and incorporated herein by reference. During a steering operation, the fluid controller 17 defines a fluid flow path communicating between the inlet port 23 and the control port 27. This fluid flow path goes through a fluid meter 67 and includes a main variable flow control orifice 71, and a variable orifice 72 communicating with the inlet of the fluid meter 67. Fluid is communicated from the outlet (metered) of the fluid meter 67 through a variable orifice 73 and a variable orifice 74 to the control port 27. Fluid displaced by the cylinder 19 returns through the control port 29, and flows through a variable orifice 75 to the return port 25, and then to a fluid reservoir 77. Also connected to the return port 25 is the load signal port 31, through a variable drain orifice 76.

Referring now to FIG. 2, the fluid controller 17 will be described only briefly herein, in view of the incorporation of U.S. Pat. No. Re. 25,126. The controller 17 comprises several sections including a valve housing 79, a port plate 81, the fluid meter 67, and an end cap 83. These sections are held together in tight sealing engagement by means of a plurality of bolts 85, which are in threaded engagement with the valve housing 79. The housing 79 defines the inlet port 23, the return port 25, and the control ports 27 and 29 (not shown in FIG. 2). The valve housing 79 defines a cylindrical valve bore 87, an annular groove 89 communicating with the inlet port 23, an annular groove 91 communicating with the return port 25, and a pair of annular grooves 93 and 94 communicating with the control ports 27 and 29, respectively.

Rotatably disposed within the valve bore 87 is the controller valving comprising a primary, rotatable valve member (spool) 95, and a cooperating, relatively rotatable follow-up valve member (slleve) 97. At the forward end of the spool 97 ia a portion having a reduced diameter, and defining a set of internal splines 99 which provide for a direct mechanical connection with a steering wheel W. The spool 95 and sleeve 97 will be described in greater detail subsequently.

The fluid meter 67 may be of any suitable construction, but in the subject embodiment, it comprises a gerotor gear set including an internally toothed stator 101, and an externally toothed rotor 103. The rotor 103 defines a set of internal splines 105, and in splined engagement therewith is a set of external splines 107 formed on the rearward end a drive shaft 109, the shaft 109 having a bifurcated forward end permitting a driving connection with the sleeve 97 by means of a pin 111. Thus, pressurized fluid flowing through the valving in response to turning of the spool 95 flows to the fluid meter 67, causing orbital and rotational movement of the rotor 103 within the stator 101. Such movement of the rotor 103 causes follow-up movement of the sleeve 97 by means of the drive shaft 109 and pin 111, to maintain an appropriate relative displacement between the spool 95 and sleeve 97, corresponding to a particular rate of rotation of the steering wheel W. When steering input is terminated, the gerotor star brings the sleeve to valve deflection blocking flow to or from the cylinder. A plurality of leaf springs 113, extending through openings in the spool 95 and sleeve 97, urges the sleeve toward the neutral position relative to the spool.

The valve housing 79 defines a plurality of axially extending bores 115, each of which communicates through an opening in the port plate 81 with one of the expanding or contracting volume chambers defined by the toothed interaction of the stator 101 and rotor 103. Communicating between each of the axial bores 115 and the valve bore 87 is a meter passage 117 which functions in association with the valving in a manner to be described subsequently.

Referring now to FIG. 3, there is shown in some detail the interface of the spool 95 and sleeve 97, at which valve action occurs. For ease of illustration and understanding, elements of the sleeve 97 are shown by solid lines, and elements of the spool 95 are shown by dotted lines, except where visible through an opening in the sleeve 97.

The valve spool 95 includes a circumferential groove 119, and a plurality of slots 121, extending axially to the right in FIG. 3, and communicating with the groove 119. Also communicating with the groove 119 is a plurality of slots 123, extending axially to the left in FIG. 3. The valve spool 95 also defines a plurality of pairs of axial slots 125, and a plurality of individual axial slots 127. Disposed adjacent each of the slots 121 is a drain opening 129, the function of which will be described subsequently.

The valve sleeve 97 defines at least one drain port 131, and a plurality of supply ports 133 which are in continuous communication with the inlet port 23. Disposed to the left of the supply ports 133 is a plurality of meter ports 135 which are connected, alternately, to the expanding volume chambers and the contracting volume chambers of the fluid meter 67, by means of commutator action with the meter passages 117, as is well known in the art. The valve sleeve 97 also defines a plurality of cylinder ports 137 which are in fluid communication with the control port 27, and a plurality of cylinder ports 139 which are in fluid communication with the control port 29. The valve sleeve 97 further defines at least a pair of load ports 141, which are in fluid communication with the load signal port 31. Finally, the sleeve 97 defines a plurality of return ports 143, which are in continuous fluid communication with the return port 25.

Referring now to FIG. 3, in conjunction with FIG. 1, the variable orifices 71–76, shown schematically in FIG. 1, will be described briefly in terms of the spool-sleeve structure of FIG. 3. When the spool 95 and the sleeve 97 are in their relative neutral position, each of the drain ports 131 is in communication with both the adjacent axial slot 121 and the adjacent drain opening 129, to permit flow from the load sensing circuit, through load sensing ports 141, then through the axial slots 123, groove 119, and slots 121. The flow area defined by the overlap of the port 131 and the slot 121 and opening 129 comprises the variable drain orifice 76 of FIG. 1. As the spool 95 and sleeve 97 are displaced from the neutral position toward the transition (intermediate) position shown in FIG. 3, flow area of the drain orifice 76 is decreased (see FIGS. 5 and 7).

As the spool and sleeve are rotated, various other ports and slots eventually begin to communicate to define the variable orifices 71–75, all of which are the opposite of the drain orifice 76, in that the variable orifices 71, 72, and 75 have a zero flow area when the spool and sleeve are in neutral, then begin to open when the spool and sleeve are in the transition from the neutral position to the fully open, operating position. The main flow control orifice 71 is defined by the overlap between the supply ports 133 and the adjacent axial slots 123. The variable orifice 72 is defined by the area of overlap of alternate meter ports 135 and the axial slots 123, while the variable orifice 73 is defined by the area of overlap of the remainder of the meter ports 135 and the axial slots 125. The variable orifice 74 is defined by the area of overlap of the cylinder ports 137 and the axial slots 125, while the variable orifice 75 is defined by the area of overlap of the cylinder ports 139 and the axial slots 127. It should be noted in FIG. 3 that the axial slots 127 are in relatively unrestricted fluid communication with the return ports 143 over the entire range of relative displacements of the spool 95 and sleeve 97.

In operation, if the spool 95 were displaced in a downward direction in FIG. 3, relative to the spool 97, pressurized fluid entering the inlet port 23 would flow through the supply ports 133, filling the axial slots 123, then flowing through the meter ports 135 and through passages 117 and bores 115 (FIG. 2) to the expanding volume chambers of the fluid meter 67. Metered fluid would flow from the contracting volume chambers of the fluid meter 67, through other of the bores 115 and passages 117, and through the alternate meter ports 135 into every other axial slot 125. Metered fluid in the slots 125 flows through the cylinder ports 137 to the control port 27, and fluid exhausted from the cylinder 19 returns to the control port 29, and then to the cylinder ports 139, and into the axial slots 127. Return fluid in the slots 127 flows through the return ports 143 to the return port 125, and then to the system reservoir 77 as described previously.

In a standard, static load signal controller, fluid pressure in the axial slots 123 would be "transmitted" through the load sensing ports 141 to the load signal port 31. However, because the system shown in FIG. 1 operates on a dynamic load signal, fluid is pumped from the priority outlet port 45 through the flow path 57 and orifice 59, then through the damping orifice 63 in the signal line 53 to the signal port 35. From the port 35, fluid is pumped through the signal line 33 to the load signal port 31, and from there through the load sensing ports 141 into the axial slots 123, thus "recombining" with the main flow path. However, it will be understood by those skilled in the art that the fluid pressure at any point in the load signal path just described is representative of the instantaneous steering load, in the same manner as in the case of a static load signal.

As is well known to those skilled in the art, it has been conventional practice in controller design to have the variable drain orifice 76 closed prior to the opening of either the main variable flow control orifice 71 or the variable orifice 75. In addition, it has been conventional design to have main orifice 71 begin to open before the orifice 75 begins to open, and to have the main orifice 71 open at a somewhat faster rate. See for example U.S. Pat. No. 4,043,419, assigned to the assignee of the present invention.

Figure 4:
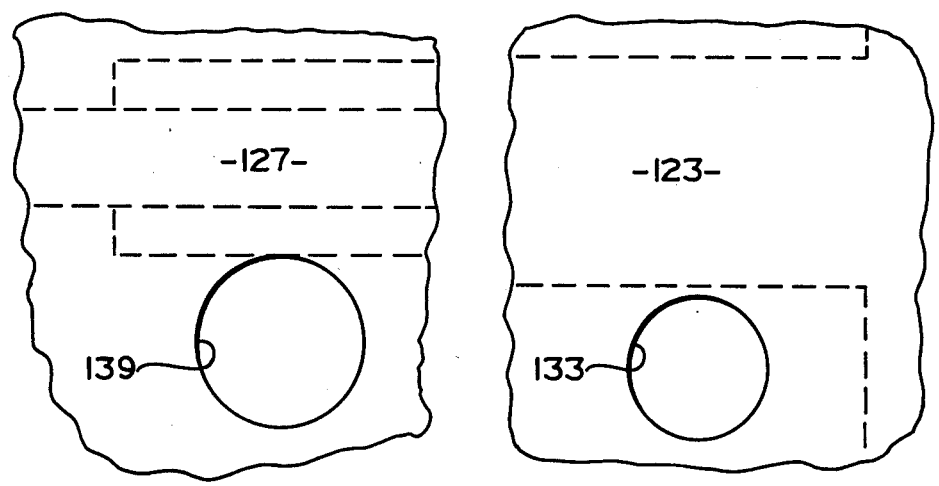
FIG. 4 is a further enlarged, fragmentary view similar to FIG. 3 illustrating one embodiment of the orifice sequencing of the present invention.
Figure 5:
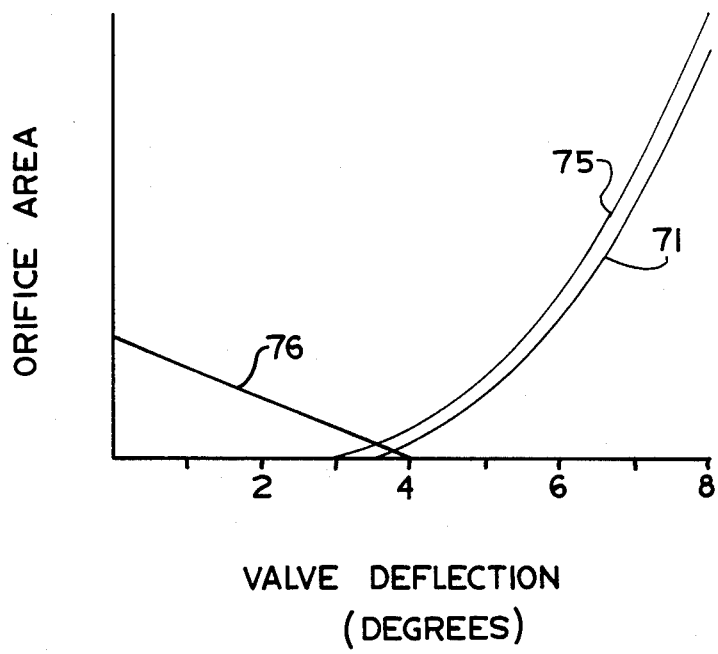
FIG. 5 is a graph of orifice area vs. valve deflection for the embodiment of the invention shown in FIG. 4.

Referring now to FIGS. 4 and 5, there is illustrated a preferred embodiment of the invention. With the spool 95 moving downward in FIG. 4, relative to the sleeve 97, it may be seen that the cylinder port 139 will begin to communicate with the slot 127, and define the variable orifice 75, before the supply port 133 begins to communicate with the slot 123, to define the main variable orifice 71. At the same time, with the spool and sleeve in the positions shown in FIGS. 3 and 4, it may be seen that there is still fluid communication between the drain port 131 and the drain opening 129, defining the drain orifice 76. This orifice sequencing is illustrated in FIG. 5 in the graph of orifice area vs. valve deflection, i.e., relative displacement between the spool 95 and sleeve 97. As may be seen in FIG. 5, the drain orifice 76 is open in the neutral position (zero degrees), but instead of closing prior to the opening of orifices 71 and 75, the drain orifice 76 of the present invention does not close completely until after the orifices 71 and 75 have begun to open. In addition, as mentioned previously, the variable orifice 75 begins to open before the main variable orifice 71 begins to open. The orifices 71 and 75, in the embodiment of FIGS. 4 and 5, open at approximately the same rate (the ports 133 and 139 are approximately the same size), such that the flow area of orifice 75 is typically greater than the flow area of orifice 71, in the first few degrees of the opening.

Figure 6:
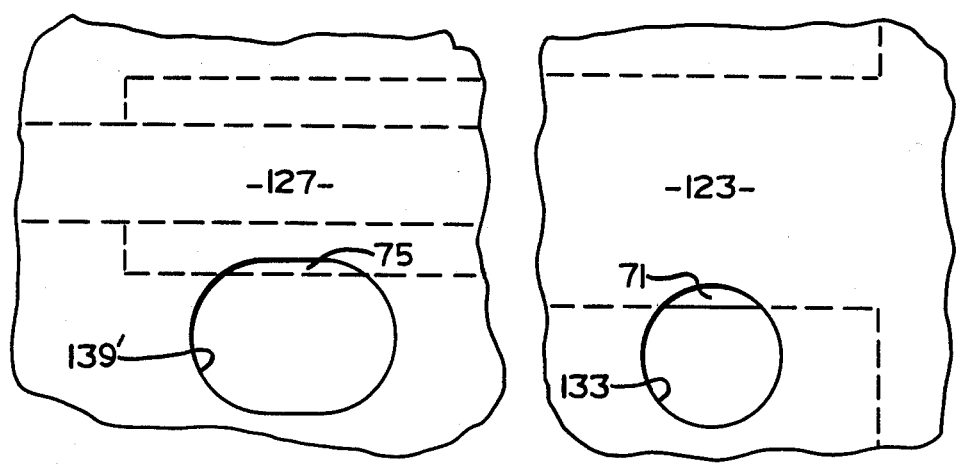
FIG. 6 is an enlarged, fragmentary view similar to FIG. 4, illustrating an alternative embodiment of the orifice sequencing of the present invention.
Figure 7:
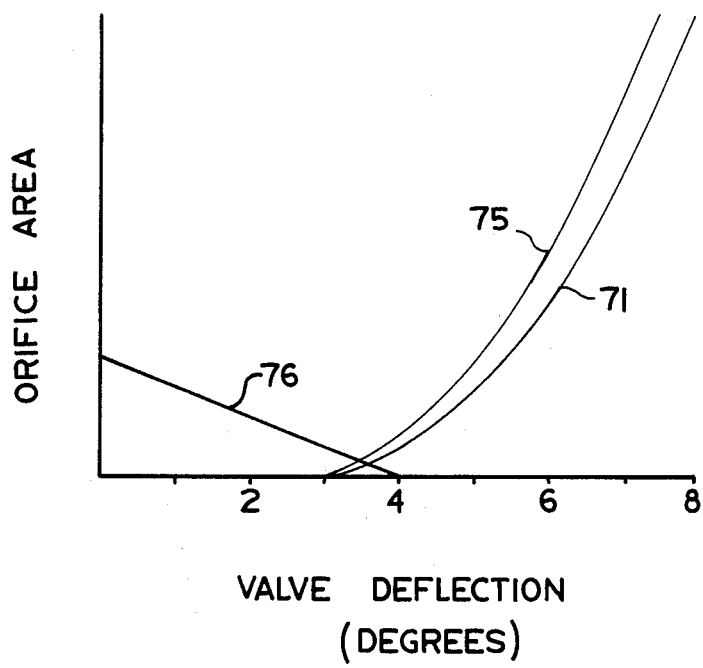
FIG. 7 is a graph similar to FIG. 5, corresponding to the embodiment of FIG. 6.

Referring now to FIGS. 6 and 7, there is illustrated an alternative embodiment of the invention, in which the cylinder port 139 of the first embodiment is replaced by an elongated cylinder port 139' which is disposed circumferentially in such a position that it begins to communicate with the slot 127 at the same time the supply port 133 begins to communicate with the slot 123. Therefore, as shown in FIG. 7, the variable orifices 75 and 71 begin to open at the same time, but still several degrees prior to the closing of the drain orifice 76, as in the first embodiment. However, in the embodiment of FIGS. 6 and 7, because the cylinder port 139' is elongated, rather than being circular, its area of overlap with the axial slot 127 is greater, and thus, the rate of opening of the variable orifice 75 is greater than the rate of opening of the main orifice 71. In either embodiment, the variable orifice 75 reaches a certain predetermined flow area before the main variable orifice 71 reaches that same flow area.

It is an important aspect of the present invention to recognize that the high transition pressures can be eliminated, without permitting the controller to cavitate, by "balancing" the various flows in the system. In order to accomplish this objective, it is necessary to analyze the following flows:

q1—from the priority outlet port 45 through the orifices 59 and 63, and the-load signal port 31 to the main flow path, downstream of the main variable orifice 71;

q2—from the priority outlet port 45 through the check valve 48 to the inlet port 23, then through the main orifice 71;

q3—from the main flow path downstream of orifice 71 through the drain orifice 76 to the reservoir 77; and Q—net flow through the main flow path:

$$Q = q1 + q2 - q3 \qquad [1]$$

It is also necessary to quantify certain pressures and pressure differentials including the following:

P—the instantaneous pressure in the main flow path, downstream of the main variable orifice 71;

dP—the pressure differential across the valve spool 49, equal to the biasing force of the spring 51;

dPv—the pressure differential across the check valve 48; and

Pm—maximum desired transition pressure, i.e., max. value of P during transition, under no-load condition.

Finally, the flow areas of the following fixed and variable orifices enter into the analysis:

a1—flow area of fixed orifice 59;

a2—flow area of fixed orifice 63;

A1—flow area of main variable orifice 71;

A5—instantaneous flow area of variable orifice 75; and

Ad—instantaneous flow area of variable drain orifice 76.

Next, equations for the various system flows are set up, using the well-known flow equation of the form:

$$q1 = k\, a1\, \sqrt{dP}, \qquad [2]$$

wherein K is a well-known constant. The equations for the other system flows are as follows:

$$q2 = K\, A1 \sqrt{\left[1 + \left(\frac{a1}{a2}\right)^2\right] dP - dPv}, \qquad [3]$$

it being understood that this equation is applicable only while the main variable orifice 71 is open. Finally, while the variable drain orifice 76 is open, $$q3 = K\, Ad\, \sqrt{P} \qquad [4]$$

By substituting equations [2], [3], and [4] in equation [1] it is possible to write the general equation for Q as follows:

$$Q = K \left\{ \left[ a1 + \right. \right. \qquad [5]$$

-continued $$A1 \sqrt{\left[1 + \left(\frac{a1}{a2}\right)^2\right] - \left(\frac{dPv}{dP}\right)} \sqrt{dP} - Ad\sqrt{P} \Bigg\}$$

While the variable drain orifice is open, but the variable orifices 71 and 75 are closed, the orifices a1 and Ad are related to the specified maximum transition pressure as follows:

$$P = \left(\frac{a1}{Ad}\right)^2 dP < Pm, \text{ or} \quad [6]$$

$$Ad > \sqrt{\frac{dP}{Pm}} \cdot a1 \quad [7]$$

Thus, equation [7] indicates a minimum area of the variable drain orifice necessary to prevent high transition pressures.

When the variable orifice 75 begins to open, at which point the drain orifice 76 has closed somewhat, main system flow Q may be expressed as follows by assuming negligible pressure drop through orifices 72, 73, and 74:

$$Q = q1 - q3 = K A5 \sqrt{P} \quad [8]$$

By setting up an equation similar to equation [6], it is possible to arrive at the following relationship:

$$(Ad + A5) > \sqrt{\frac{dP}{Pm}} \cdot a1 \quad [9]$$

By comparing equations [7] and [9], it may be seen that, prior to variable orifice 71 beginning to open, variable orifice 75 must increase at a rate equal to or greater than the rate of decrease of the drain orifice 76 in order to prevent high transition pressures.

Finally, when the main variable orifice 71 begins to open, at which point the drain orifice 76 has closed a little more, main system flow Q may be expressed as follows by assuming negligible pressure drop through orifices 72, 73, and 74:

$$Q = q1 + q2 - q3 = K A5 \sqrt{P} \quad [10]$$

By setting up an equation similar to equations [6] and [9], the following relationship may be seen:

$$(Ad + A5) > \sqrt{\frac{dP}{Pm}} \left[ a1 + A1 \sqrt{\left[1 + \left(\frac{a1}{a2}\right)^2\right] - \frac{dPv}{dp}} \right] \quad [11]$$

Thus, equation [11] provides the general relationship from which it is possible to size the various orifices, relative to each other, to accomplish the objectives of the present invention.

The present invention has been described in detail sufficient to permit one skilled in the art to practice the invention. Obviously, alterations and modifications of the invention will occur to others upon a reading and understanding of the specification, and it is intended to include all such alterations and modifications as part of the invention, insofar as they come within the scope of the appended claims.

What is claimed is:

1. In a fluid controller operable to control the flow of fluid from a source of pressurized fluid to a fluid pressure operated device, the source of fluid including pressure responsive means for varying the delivery of fluid to the controller, the controller being of the type including:

(1) housing means including an inlet port for connection to the source of fluid, a return port for connection to a reservoir, first and second control fluid ports for connection to the fluid pressure operated device, and a load signal port for connection to the pressure responsive means;
   (2) valve means disposed in said housing means and defining a neutral position and at least one operating position;
   (3) means for imparting follow-up movement to return said valve means to said neutral position in response to the flow of fluid to or from the fluid pressure operated device;
   (4) said valve means defining a load signal circuit operable to communicate to said load signal port a fluid pressure representative of the load on the fluid pressure operated device;
   (5) said valve means cooperating with said housing means to define a first flow path communicating between said inlet port and said follow-up means, a second flow path communicating between said follow-up means and one of said control fluid ports, and a third flow path communicating between the other of said control fluid ports and said return port, said first, second, and third flow paths including first, second, and third variable orifices, respectively, at least said first and third variable orifices having a zero flow area when said valve means is in said neutral position, and a gradually increasing flow area as said valve means is moved toward said operating position;
   (6) said valve means and said housing means defining a drain flow path communicating between said load signal circuit and said return port and including a variable drain orifice having a maximum flow area when said valve means is in said neutral position and progressively decreasing to a zero flow area as said valve means moves toward said operating position;

the source of pressurized fluid including means operable to communicate dynamic load signal fluid into said load signal circuit, characterized by:

(a) said third variable orifice begins to open before said first variable orifice begins to open as said valve means moves from said neutral position to said operating position; and
   (b) said variable drain orifice remains open at least until said third variable orifice begins to open, thereby substantially reducing pressure spikes in said flow paths as said valve means moves from said neutral position to said operating position.

2. In a fluid controller operable to control the flow of fluid from a source of pressurized fluid to a fluid pressure operated device, the source of fluid including pressure responsive means for varying the delivery of fluid to the controller, the controller being of the type including:
- (1) housing means including an inlet port for connection to the source of fluid, a return port for connection to a reservoir, first and second control fluid ports for connection to the fluid pressure operated device, and a load signal port for connection to the pressure responsive means;
- (2) valve means disposed in said housing means including a primary rotatable valve member and a cooperating relatively rotatable follow-up valve member, said valve members defining a neutral position, and being relatively displaceable to an operating position;
- (3) means for imparting follow-up movement to said follow-up valve member in response to the flow of fluid to or from the fluid operated device;
- (4) means coupling said follow-up valve member to said primary valve member for limited movement relative to said neutral position, and for common rotary movement therewith;
- (5) said valve means defining a load signal circuit operable to communicate to said load signal port a fluid pressure representative of the load on the fluid pressure operated device;
- (6) said valve means cooperating with said housing means to define a first flow path communicating between said inlet port and said follow-up means, a second flow path communicating between said follow-up means and one of said control fluid ports, and a third flow path communicating between the other of said control fluid ports and said return port, said first, second, and third flow paths including first, second, and third variable orifices, respectively, each of said first, second, and third variable orifices having a zero flow area when said primary valve member and said follow-up valve member are in said neutral position, and a gradually increasing flow area as said valve members are relatively displaced toward said operating position;
- (7) said valve means and said housing means defining a drain flow path communicating between said load signal circuit and said return port and including a variable drain orifice having a maximum flow area when said primary and follow-up valve members are in said neutral position, and progressively decreasing to a zero flow area as said primary and follow-up valve members are relatively displaced toward said operating position;

the source of pressurized fluid including means operable to communicate dynamic load signal fluid into said load signal circuit, characterized by:
- (a) said third variable orifice begins to open before said first variable orifice begins to open, as said primary and follow-up valve members are relatively displaced from said neutral position toward said operating position; and
- (b) said variable drain orifice remains open at least until said third variable orifice begins to open, thereby substantially reducing pressure spikes in said flow paths as said primary and follow-up valve members are relatively displaced from said neutral position to said operating position.

3. In a fluid controller operable to control the flow of fluid from a source of pressurized fluid to a fluid pressure operated device, the source of fluid including pressure responsive means for varying the delivery of fluid to the controller, the controller being of the type including:
- (1) housing means including an inlet port for connection to the source of fluid, a return port for connection to a reservoir, first and second control fluid ports for connection to the fluid pressure operated device, and a load signal port for connection to the pressure responsive means;
- (2) valve means disposed in said housing means and defining a neutral position and at least one operating position;
- (3) means for imparting follow-up movement to return said valve means to said neutral position in response to the flow of fluid to or from the fluid pressure operated device;
- (4) said valve means defining a load signal circuit operable to communicate to said load signal port a fluid pressure representative of the load on the fluid pressure operated device;
- (5) said valve means cooperating with said housing means to define a first flow path communicating between said inlet port and said follow-up means, a second flow path communicating between said follow-up means and one of said control fluid ports, and a third flow path communicating between the other of said control fluid ports and said return port, said first, second, and third flow paths including first, second, and third variable orifices, respectively, at least said first and third variable orifice having a zero flow area when said valve means is in said neutral position, and a gradually increasing flow area as said valve means is moved toward said operating position;
- (6) said valve means and said housing means defining a drain flow path communicating between said load signal circuit and said return port and including a variable drain orifice having a maximum flow area when said valve means is in said neutral position and progressively decreasing to a zero flow area as said valve means moves toward said operating position;

the source of pressurized fluid including means operable to communicate dynamic load signal fluid into said load signal circuit, characterized by:
- (a) said third variable orifice begins to open at least as soon as said first variable orifice begins to open as said valve means moves from said neutral position to said operating position, said third variable orifice having a larger flow area than said first variable orifice throughout the entire range of said movement of said valve means toward said operating position; and
- (b) said variable drain orifice remains open at least until said third variable orifice begins to open, thereby substantially reducing pressure spikes in said flow paths as said valve means moves from said neutral position to said operating position.

4. In a fluid controller operable to control the flow of fluid from a source of pressurized fluid to a fluid pressure operated device, the source of fluid including pressure responsive means for varying the delivery of fluid to the controller, the controller being of the type including:
- (1) housing means including an inlet port for connection to the source of fluid, a return port for connection to a reservoir, first and second control fluid ports for connection to the fluid pressure operated device, and a load signal port for connection to the pressure responsive means;

(2) valve means disposed in said housing means including a primary rotatable valve member and a cooperating relatively rotatable follow-up valve member, said valve members defining a neutral position, and being relatively displaceable to an operating position;

(3) means for imparting follow-up movement to said follow-up valve member in response to the flow of fluid to or from the fluid operated device;

(4) means coupling said follow-up valve member to said primary valve member for limited movement relative to said neutral position, and for common rotary movement therewith;

(5) said valve means defining a load signal circuit operable to communicate to said load signal port a fluid pressure representative of the load on the fluid pressure operated device;

(6) said valve means cooperating with said housing means to define a first flow path communicating between said inlet port and said follow-up means, a second flow path communicating between said follow-up means and one of said control fluid ports, and a third flow path communicating between the other of said control fluid ports and said return port, said first, second, and third flow paths including first, second, and third variable orifices, respectively, each of said first, second, and third variable orifices having a zero flow area when said primary valve member and said follow-up valve member are in said neutral position, and a gradually increasing flow area as said valve members are relatively displaced toward said operating position;

(7) said valve means and said housing means defining a drain flow path communicating between said load signal circuit and said return port and including a variable drain orifice having a maximum flow area when said primary and follow-up valve members are in said neutral position, and progressively decreasing to a zero flow area as said primary and follow-up valve members are relatively displaced toward said operating position;

the source of pressurized fluid including means operable to communicate dynamic load signal fluid into said load signal circuit, characterized by:

(a) said third variable orifice begins to open at least as soon as said first variable orifice begins to open, as said primary and follow-up valve members are relatively displaced from said neutral position toward said operating position, and said third variable orifice having a larger flow area than said first variable orifice throughout the entire range of said relative displacement of said valve members toward said operating position; and (b) said variable drain orifice remains open at least until said third variable orifice begins to open, thereby substantially reducing pressure spikes in said flow paths as said primary and follow-up valve members are relatively displaced from said neutral position to said operating position.

5. A fluid controller as claimed in claim 1 or 2 or 3 or 4 characterized by the pressure responsive means comprising a flow control valve disposed in series flow relationship between the fluid source and the controller, the flow control valve including an inlet port in fluid communication with the fluid source, a priority outlet port in fluid communication with said first variable orifice, an auxiliary outlet port in fluid communication with an auxiliary load circuit, and a load signal port in fluid communication with the load signal port of said fluid controller.

6. A fluid controller as claimed in claim 5 characterized by said flow control valve including a valve member disposed to control fluid flow from said inlet port to said priority and auxiliary outlet ports, and means biasing said valve member toward a position permitting substantially unrestricted fluid communication from said inlet port to said priority outlet port.

7. A fluid controller as claimed in claim 6 characterized by said biasing means including load signal passage means communicating between said load signal port of said flow control valve and a load pressure chamber of said flow control valve.

8. A fluid controller as claimed in claim 7 characterized by said means to communicate dynamic load signal fluid comprising said flow control valve defining dynamic signal passage means communicating between said priority outlet port and said load pressure chamber, said dynamic signal passage means including a dynamic signal orifice to regulate the flow of fluid through said dynamic signal passage means.

9. A fluid controller as claimed in claim 8 characterized by said flow control valve defining a pilot pressure chamber and pilot passage means communicating between said priority outlet port and said pilot pressure chamber, the fluid pressure in said pilot pressure chamber biasing said valve member toward a position permitting substantially unrestricted fluid communication from said inlet port to said auxiliary outlet port.

10. A fluid controller as claimed in claim 1 or 2 or 3 or 4 characterized by said third variable orifice opening at a rate equal to or greater than the rate of decrease of said variable drain orifice during the time both of said variable orifices are open.

* * * * *